US012375392B2

(12) United States Patent
Guan et al.

(10) Patent No.: US 12,375,392 B2
(45) Date of Patent: Jul. 29, 2025

(54) PACKET PROCESSING METHOD AND RELATED DEVICE

(71) Applicant: HUAWEI TECHNOLOGIES CO., LTD., Shenzhen (CN)

(72) Inventors: Chenchen Guan, Nanjing (CN); Guifeng Liu, Cairo (EG)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/487,568

(22) Filed: Oct. 16, 2023

(65) Prior Publication Data

US 2024/0039835 A1 Feb. 1, 2024

Related U.S. Application Data

(63) Continuation of application No. PCT/CN2022/081656, filed on Mar. 18, 2022.

(30) Foreign Application Priority Data

Apr. 15, 2021 (CN) .......................... 202110407560.9

(51) Int. Cl.
*H04L 45/24* (2022.01)
*H04L 12/46* (2006.01)
*H04L 45/50* (2022.01)

(52) U.S. Cl.
CPC ........ *H04L 45/245* (2013.01); *H04L 12/4633* (2013.01); *H04L 45/50* (2013.01)

(58) Field of Classification Search
CPC .... H04L 45/245; H04L 12/4633; H04L 45/50
See application file for complete search history.

(56) References Cited

U.S. PATENT DOCUMENTS

| 2008/0117884 | A1* | 5/2008 | Ishii | H04W 12/062 370/338 |
|---|---|---|---|---|
| 2017/0257309 | A1* | 9/2017 | Appanna | H04L 12/4641 |
| 2018/0183906 | A1* | 6/2018 | Chanda | H04L 41/12 |
| 2019/0080306 | A1* | 3/2019 | Schlachet | G06F 11/3006 |
| 2019/0253381 | A1* | 8/2019 | Ji | H04L 45/22 |
| 2020/0204480 | A1* | 6/2020 | Lo | H04L 45/245 |
| 2020/0314003 | A1* | 10/2020 | Nandy | H04L 69/14 |
| 2021/0014155 | A1* | 1/2021 | Punj | H04L 45/745 |

FOREIGN PATENT DOCUMENTS

CN    104135420 A    11/2014

* cited by examiner

*Primary Examiner* — Phuoc H Nguyen
*Assistant Examiner* — Steven C Nguyen
(74) *Attorney, Agent, or Firm* — Leydig, Voit & Mayer, Ltd.

(57) ABSTRACT

A packet processing method and a related device are disclosed for saving access control list resources. A first network device receives a packet sent by a second network device. The packet reaches the first network device through a tunnel between the first network device and the second network device. The first network device determines a reserved port that is of the first network device and that corresponds to a port of the tunnel. The first network device processes the packet based on the reserved port.

9 Claims, 6 Drawing Sheets

PACKET PROCESSING METHOD AND RELATED DEVICE

CROSS-REFERENCE TO RELATED APPLICATIONS

This is a continuation of International Patent Application No. PCT/CN2022/081656 filed on Mar. 18, 2022, which claims priority to Chinese Patent Application No. 202110407560.9 filed on Apr. 15, 2021. The disclosures of the aforementioned applications are hereby incorporated by reference in their entireties.

TECHNICAL FIELD

The present disclosure relates to the field of communications, and in particular, to a packet processing method and a related device.

BACKGROUND

Currently, a multi-chassis link aggregation group (M-LAG) technology is used to improve reliability of an access device (which may be a switch, an access router, or the like, and collectively referred to as a network device below). A terminal device (for example, a server, a personal computer, and a mobile device) is separately connected to a first network device and a second network device through two links, and the two links form an M-LAG. One or more peer links (peer links) exist between the first network device and the second network device that are member devices of the M-LAG. The links are used for protocol interaction between the first network device and the second network device and traffic forwarding in a network fault scenario.

In a conventional technology, a protocol packet is sent and a data packet is forwarded through a peer link-based tunnel between the first network device and the second network device that are member devices of the M-LAG. To prevent the first network device and the second network device from forwarding an unnecessary packet through the peer link, an access control list (ACL) rule is configured on each network device, and a packet transmitted through the tunnel is identified and isolated (for example, discarded) according to the rule. Because the isolation needs to additionally occupy an ACL bank (bank), and ACL banks of a chip on a network device are limited (where the chip usually has more than ten and less than twenty ACL banks, and each ACL bank is used to store one type of ACL), that the ACL rule is written to the chip wastes ACL resources.

SUMMARY

The present disclosure provides a packet processing method and a related device, to save access control list ACL resources.

A first aspect of the present disclosure provides a packet processing method. The method includes: A first network device receives a packet sent by a second network device. The packet is sent through a tunnel between the first network device and the second network device. After the first network device receives the packet, the first network device determines a reserved port corresponding to a port of the tunnel. The first network device processes the packet based on the reserved port. Because a corresponding packet processing rule is pre-configured for the reserved port of the first network device, the first network device processes the packet according to the packet processing rule corresponding to the reserved port.

The first network device determines the reserved port corresponding to the port of the tunnel of the packet, and processes the packet based on packet processing logic corresponding to the reserved port. It can be learned from the foregoing packet processing process that the first network device does not need to additionally configure an ACL rule when processing the packet, thereby saving ACL resources in the first network device.

In a possible implementation, in a process in which the first network device processes the packet based on the reserved port, the first network device sets the reserved port as a source port of the packet. Specifically, after the first network device receives the packet, the packet is decapsulated, and the reserved port is used as a source port of a decapsulated packet.

In a possible implementation, when the packet received by the first network device is a data packet that does not need to be forwarded, in the process in which the first network device processes the packet based on the reserved port, when the first network device has an isolation port corresponding to the reserved port, the first network device discards the packet. The isolation port and the reserved port are in a same isolation group. The isolation port may be a member port of an M-LAG. Communication between ports in the isolation group is forbidden.

An isolation group pre-configured by the first network device can implement isolation between the reserved port and the isolation port, and further implement packet discarding through the isolation port, without occupying additional ACL resources, thereby simplifying implementation logic of a solution.

In a possible implementation, when the packet received by the first network device is a protocol packet, in the process in which the first network device processes the packet based on the reserved port, the first network device performs protocol processing on the packet based on the reserved port.

Specifically, the first network device queries whether the reserved port is configured in a port list. The port list is for identifying a packet that needs the protocol processing. If the reserved port is configured in the port list, the first network device performs protocol processing on the packet after decapsulating the packet. The protocol processing includes matching a protocol packet characteristic according to the ACL rule and sending the protocol packet to a chip of the first network device.

When the packet received by the first network device is the protocol packet, the first network device performs protocol processing depending on whether the reserved port exists in the port list, and no additional ACL bank needs to be added to match the protocol packet, thereby saving ACL resources of the first network device.

In a possible implementation, the first network device and the second network device form a multi-chassis link aggregation group M-LAG. In other words, the first network device and the second network device are member devices of the M-LAG. A first port of the first network device and a second port of the second network device are member ports of the M-LAG. The isolation port includes the first port, to be specific, the first port may be the isolation port corresponding to the reserved port.

A quantity of member devices of the multi-chassis link aggregation group M-LAG is not limited. The isolation port may be a member port of one or more M-LAGs. This is not specifically limited.

In a possible implementation, before the first network device performs protocol processing on the packet based on the reserved port, the first network device pre-sets the reserved port in the port list. The port list is for identifying a packet that needs the protocol processing.

In a possible implementation, the first network device establishes a mapping relationship between the port of the tunnel and the reserved port of the first network device. Specifically, a control plane of the first network device delivers the mapping relationship to the chip.

Further, the first network device determines, based on the mapping relationship, the reserved port that is of the first network device and that corresponds to the port of the tunnel.

The first network device pre-establishes the mapping relationship between the port of the tunnel between the member devices of the M-LAG and the reserved port, and determines, based on the mapping relationship, the reserved port corresponding to the port of the tunnel, thereby improving implementability of the solution.

In a possible implementation, one or more tunnels exist between the first network device and the second network device. When a plurality of tunnels exist between the first network device and the second network device, ports of the plurality of tunnels are respectively mapped to different reserved ports. The tunnel between the first network device and the second network device includes an IPv4 tunnel or an IPv6 tunnel.

In a possible implementation, the tunnel is a virtual extensible local area network (VXLAN) tunnel, or a generic routing encapsulation (GRE) tunnel, or a multi-protocol label switching (MPLS) tunnel.

The tunnel between the first network device and the second network device includes a plurality of types of tunnels, thereby improving applicability of the solution.

A second aspect of the present disclosure provides a network device. The network device includes:
- a transceiver unit, configured to receive a packet sent by a second network device, where the packet reaches a first network device through a tunnel between the first network device and the second network device;
- a determining unit, configured to obtain a reserved port that is of the first network device and that corresponds to a port of the tunnel; and
- a processing unit, configured to process the packet based on the reserved port.

The network device can determine the reserved port corresponding to the port of the tunnel of the received packet, and process the packet based on packet processing logic corresponding to the reserved port. The network device does not need to additionally configure an ACL rule when processing the packet, thereby saving ACL resources in the network device.

In a possible implementation, the processing unit is specifically configured to set the reserved port as a source port of the packet.

In a possible implementation, the processing unit is specifically configured to discard the packet at an isolation port when the isolation port corresponding to the reserved port exists. The isolation port and the reserved port are in a same isolation group, and communication between ports in the isolation group is forbidden.

In a possible implementation, when the packet is a protocol packet, the processing unit is specifically configured to perform protocol processing on the packet based on the reserved port.

In a possible implementation, the processing unit is further configured to set the reserved port in a port list. The port list is for identifying a packet that needs the protocol processing.

In a possible implementation, the network device and the second network device form a multi-chassis link aggregation group M-LAG. A first port of the network device and a second port of the second network device are member ports of the M-LAG, and the isolation port includes the first port.

In a possible implementation, the processing unit is further configured to establish a mapping relationship between the port of the tunnel and the reserved port of the network device.

Further, the processing unit is specifically configured to determine, based on the mapping relationship, the reserved port that is of the first network device and that corresponds to the port of the tunnel.

In a possible implementation, one or more tunnels exist between the network device and the second network device. When a plurality of tunnels exist between the network device and the second network device, ports of the plurality of tunnels are respectively mapped to different reserved ports.

In a possible implementation, the tunnel is a virtual extensible local area network VXLAN tunnel, or a generic routing encapsulation GRE tunnel, or a multi-protocol label switching MPLS tunnel.

A third aspect of the present disclosure provides a network device. The network device includes: a processor, a memory, and an interface. The memory is configured to store instructions. The processor is configured to communicate with the memory, and execute the instructions in the memory on the network device, to perform the method according to the first aspect and any possible implementation.

A fourth aspect of the present disclosure provides a computer-readable storage medium including instructions. When the instructions are run on a computer, the computer is enabled to perform the method according to the first aspect and any possible implementation.

A fifth aspect of the present disclosure provides a computer program product. When the computer program product is run on a computer, the computer is enabled to perform the method according to the first aspect and any possible implementation.

DESCRIPTION OF EMBODIMENTS

Figure 1A:
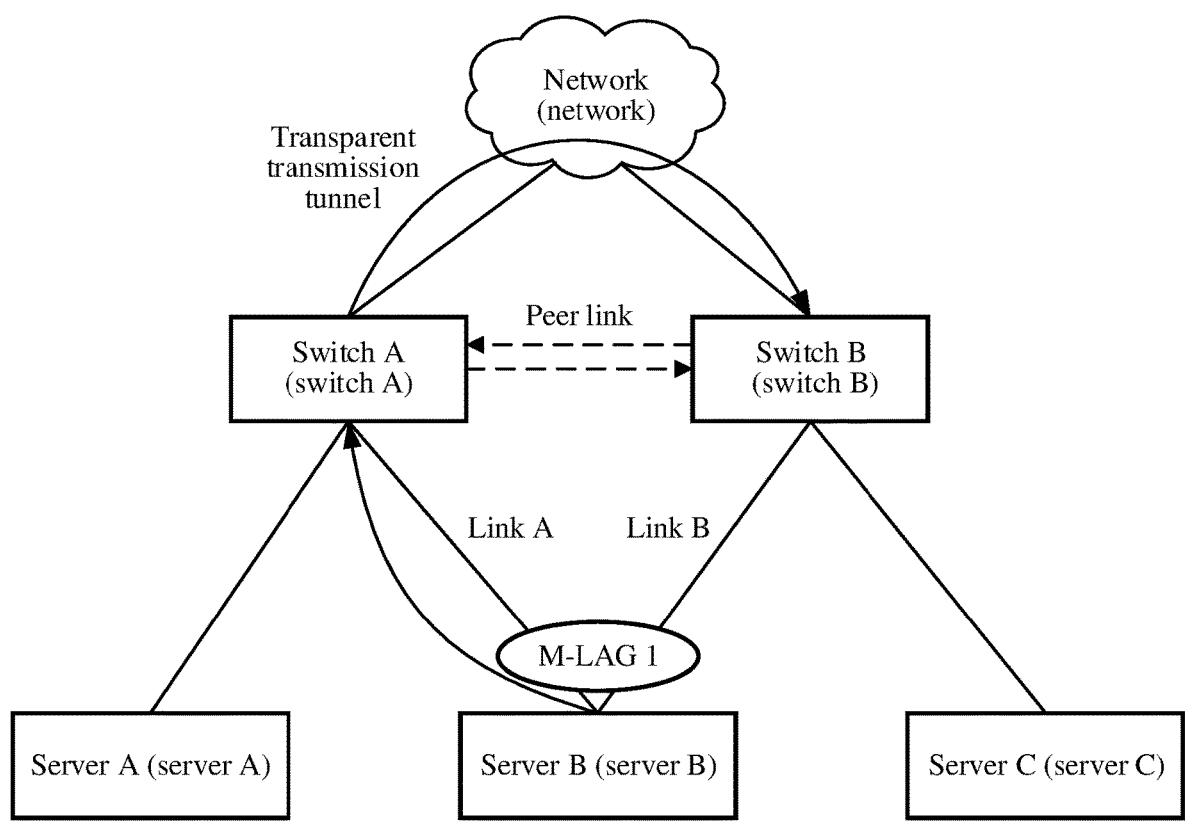
FIG. 1a is a schematic diagram of an application scenario of a packet processing method according to an embodiment.

Embodiments of the present disclosure provide a packet processing method, to simplify packet processing logic and save access control list resources. The following describes the technical solutions in embodiments of this application with reference to the accompanying drawings. The described embodiments are merely some but not all of embodiments of the present disclosure.

In the specification, claims, and accompanying drawings, the terms "first", "second", "third", "fourth", and the like (if they exist) are intended to distinguish between similar objects but do not necessarily describe a specific order or sequence. It should be understood that the data used in such a way are interchangeable in proper circumstances so that embodiments described herein can be implemented in an order other than the order illustrated or described herein. Moreover, the terms "include", "have" and any other variants mean to cover the non-exclusive inclusion, for example, a process, method, system, product, or device that includes a list of steps or units is not necessarily limited to those steps or units that are clearly listed, but may include other steps or units not expressly listed or inherent to such a process, method, product, or device.

The terms "example" or "for example" are used as an example, an illustration, or a description. Any embodiment or design solution described as "example" or "for example" in embodiments should not be explained as being more preferred or having more advantages than another embodiment or design solution. Exactly, use of the words "example", "for example", or the like is intended to present a related concept in a specific manner.

The following describes some terms, to facilitate understanding of a person skilled in the art.

A virtual extensible local area network (VXLAN) is a network virtualization technology, to resolve a scalability problem caused by large-scale cloud computing deployment. The VXLAN is an extension of a VLAN and encapsulates traffic and extends the traffic to a third layer gateway. A main principle is to introduce an outer tunnel in a user datagram protocol (UDP) format as a data link layer. An original data packet content is transmitted as a tunnel payload. Because the outer tunnel uses the UDP as a transmission method, payload data can be easily transmitted in a layer 2 and layer 3 network.

A spanning tree protocol (STP) is a data link layer communication protocol that works in an open system interconnection (OSI) reference model. A basic application of the protocol is to prevent a loop generated by a redundant link of a switch, to ensure a logical topology structure without a loop in an Ethernet network, thereby avoiding a broadcast storm.

A multi-chassis link aggregation group (M-LAG) is a mechanism for implementing multi-chassis link aggregation. A terminal device is separately connected to two network devices through two different access links. The two access links form the M-LAG, thereby improving link reliability to a device level.

The following describes a packet processing method and a related device provided in embodiments with reference to the accompanying drawings.

Refer to FIG. Ta. FIG. 1*a* is a schematic diagram of an application scenario of a packet processing method according to an embodiment. As shown in the figure, the scenario is a multi-chassis link aggregation scenario, and a server B is separately connected to a switch A and a switch B through a link A and a link B. The link A and the link B form a multi-chassis link aggregation group M-LAG 1. The link A and the link B are member links of the M-LAG 1, and the switch A and the switch B are member devices of the M-LAG 1. The switch A and the switch B may alternatively be used as member devices of a multi-chassis link aggregation group corresponding to another server, for example, a server A or a server C.

There are at least two peer links between the switch A and the switch B. The peer links are used for protocol interaction between the switch A and the switch B and traffic forwarding in a fault scenario. When the aggregation link M-LAG 1 is normal, the peer link is used only for protocol interaction without data traffic forwarding. In this case, bandwidth utilization of the peer link is low.

In another scenario in which the server performs multi-chassis link aggregation, the switch A and the switch B establish a transparent transmission tunnel to replace the foregoing peer link. The switch A and the switch B use the transparent transmission tunnel to forward a protocol packet and a data packet that needs to be bypassed. Because no peer link exists in the scenario, costs required for configuring the peer link are saved, and the fault scenario of the peer link is eliminated. The transparent transmission tunnel replaces the peer link to release a port of the switch and increase a quantity of accessed servers. The following describes the scenario with reference to FIG. 1*b*.

Figure 1B:
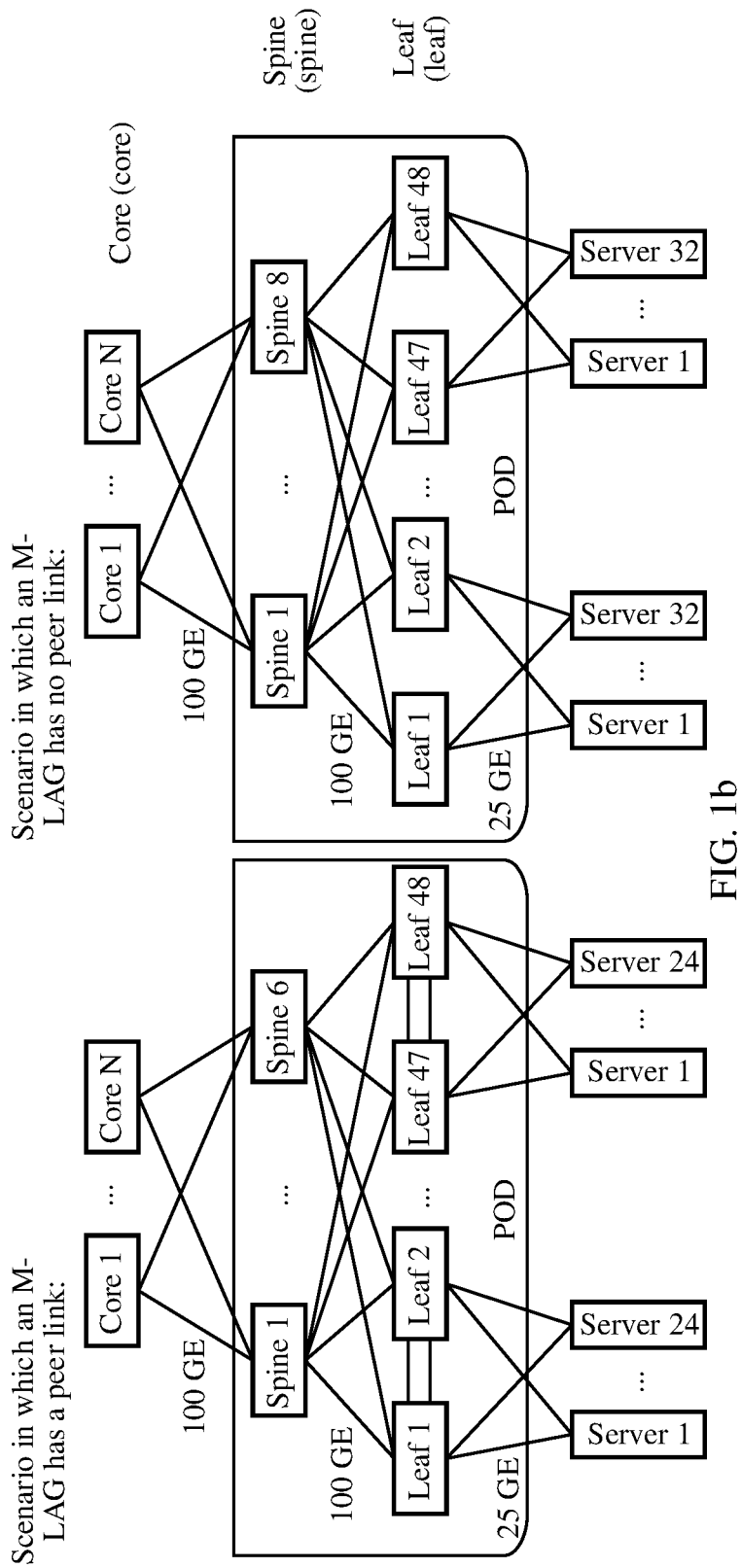
FIG. 1b is a schematic diagram of another application scenario of a packet processing method according to an embodiment.

Refer to FIG. 1*b*. FIG. 1*b* is a schematic diagram of a leaf-spine network topology. The leaf-spine network topology includes a leaf switch (for example, a leaf 1 in FIG. 1*b*), a spine switch (for example, a spine 1 in FIG. 1*b*), and a core switch (for example, a core 1 in FIG. 1*b*). The leaf switch may be used as a member device of a multi-chassis link aggregation group (for example, the leaf 1 and the leaf 2 are member devices of the M-LAG in the figure). The left section of the figure is a server access scenario in which the member devices in the multi-chassis link aggregation group have a peer link. The right section of the figure is a server access scenario in which the member devices in the multi-chassis link aggregation group have no peer link but a transparent transmission tunnel is established.

As shown in FIG. 1*b*, because there is no peer link between the member devices of the multi-chassis link aggregation group, each leaf switch can release two 100 Gigabit Ethernet (GE) interfaces, and each interface can support access to four 25 GE servers. Each leaf switch can connect to eight more servers, and a single point of delivery (POD) has 48 leaves. Therefore, 384 servers can be added to the single POD.

In this embodiment, a protocol packet is forwarded and a packet is bypassed by using the transparent transmission tunnel, thereby increasing a quantity of accessed user servers. Bypass means that the packet needs to be sent to another member device through a member device of the M-LAG, and then sent to a destination device by the another member device. For example, in FIG. 1*a*, it is assumed that the link A is faulty. A packet sent by the server A to the server B needs to be sent to the switch B through the switch A, and then sent to the server B by the switch B.

Figure 2:
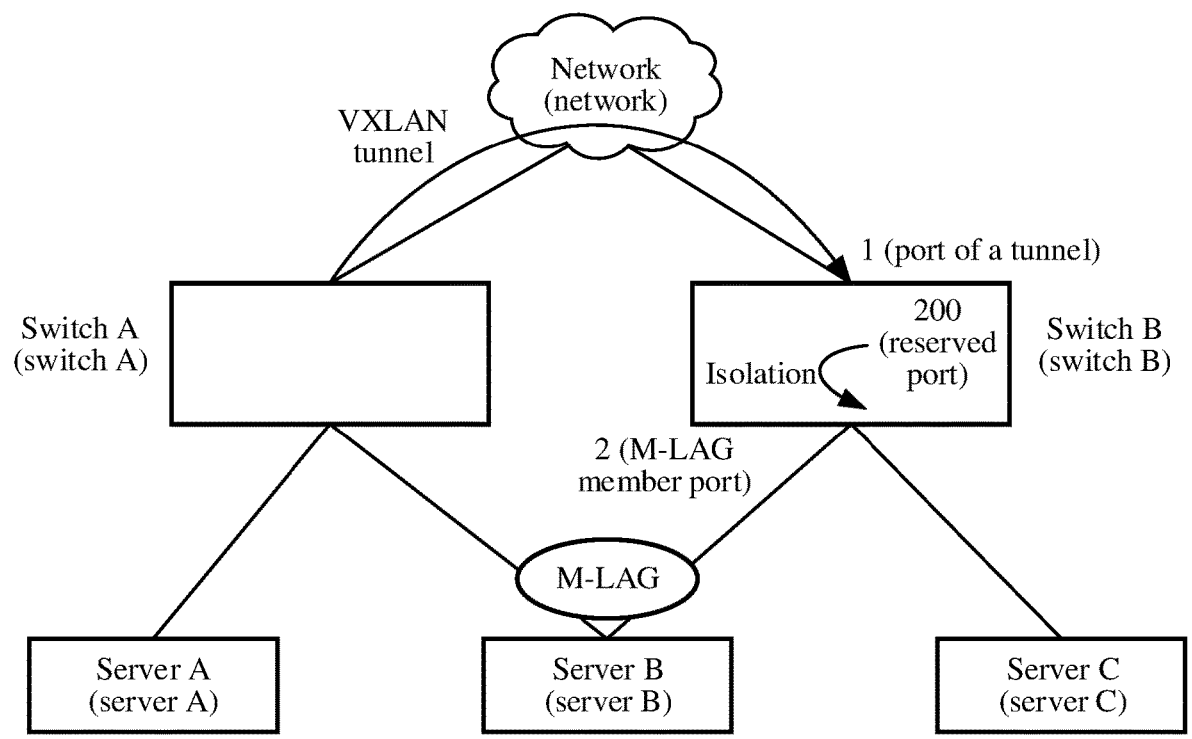
FIG. 2 is a schematic diagram of a system architecture of a packet processing method according to an embodiment.

Based on the scenarios shown in FIG. 1*a* and FIG. 1*b*, the present disclosure provides a system architecture. The following describes a system architecture in an embodiment with reference to FIG. 2. The system architecture includes a first network device and a second network device. The first network device and the second network device are member devices of a multi-chassis link aggregation group. In FIG. 2, a switch B is used as an example for the first network device, and a switch A is used as an example for the second network device. A transparent transmission tunnel is established between the switch A and the switch B. The transparent transmission tunnel is configured to forward a protocol packet and bypass a packet. The transparent transmission tunnel may be, for example, a VXLAN tunnel.

As shown in FIG. 2, the VXLAN tunnel is established between the switch A and the switch B, the switch A and the switch B are member devices of the multi-chassis link aggregation group, and a server A and a server C may communicate through the VXLAN tunnel. A port 1 of the VXLAN tunnel of the switch B is mapped to a reserved port 200 of the switch B. The reserved port 200 may be pre-configured to be in the same isolation group as an M-LAG member port 2, the isolation group is configured to implement port isolation, and the isolation group includes the port 1 of the tunnel and the reserved port 200. When the switch B is a member device of a plurality of M-LAGs, the switch B stores one isolation group for each M-LAG in the plurality of M-LAGs. Each isolation group includes a port of a tunnel and a reserved port that correspond to each M-LAG. The reserved ports of the plurality of M-LAGs may be the same or different. Further, the switch B may further include a port list for identifying a protocol packet that needs protocol processing. The port list includes the reserved port 200. The switch B further performs protocol processing on a protocol packet received through the reserved port 200. The switch may identify the protocol packet according to an ACL rule.

After a data packet sent by the server B reaches the switch B through the switch A, the switch B finds the corresponding reserved port 200 based on the port 1 of the tunnel that receives the data packet, searches for the port isolation group corresponding to the reserved port 200, and finds the M-LAG member port 2. In this case, the data packet is not sent to the member port 2 (in other words, the data packet is discarded at the member port 2). In this way, a loop generated by returning the data packet to the server B through the M-LAG member port 2 of the switch B can be avoided.

The first network device and the second network device in this embodiment include but are not limited to the switch, and may alternatively be other servers or routers that support multi-chassis link aggregation. This is not specifically limited.

The foregoing describes the system architecture and the application scenario in embodiments. The following describes the packet processing method provided in embodiments by using a data packet and a protocol packet as examples.

Figure 3:
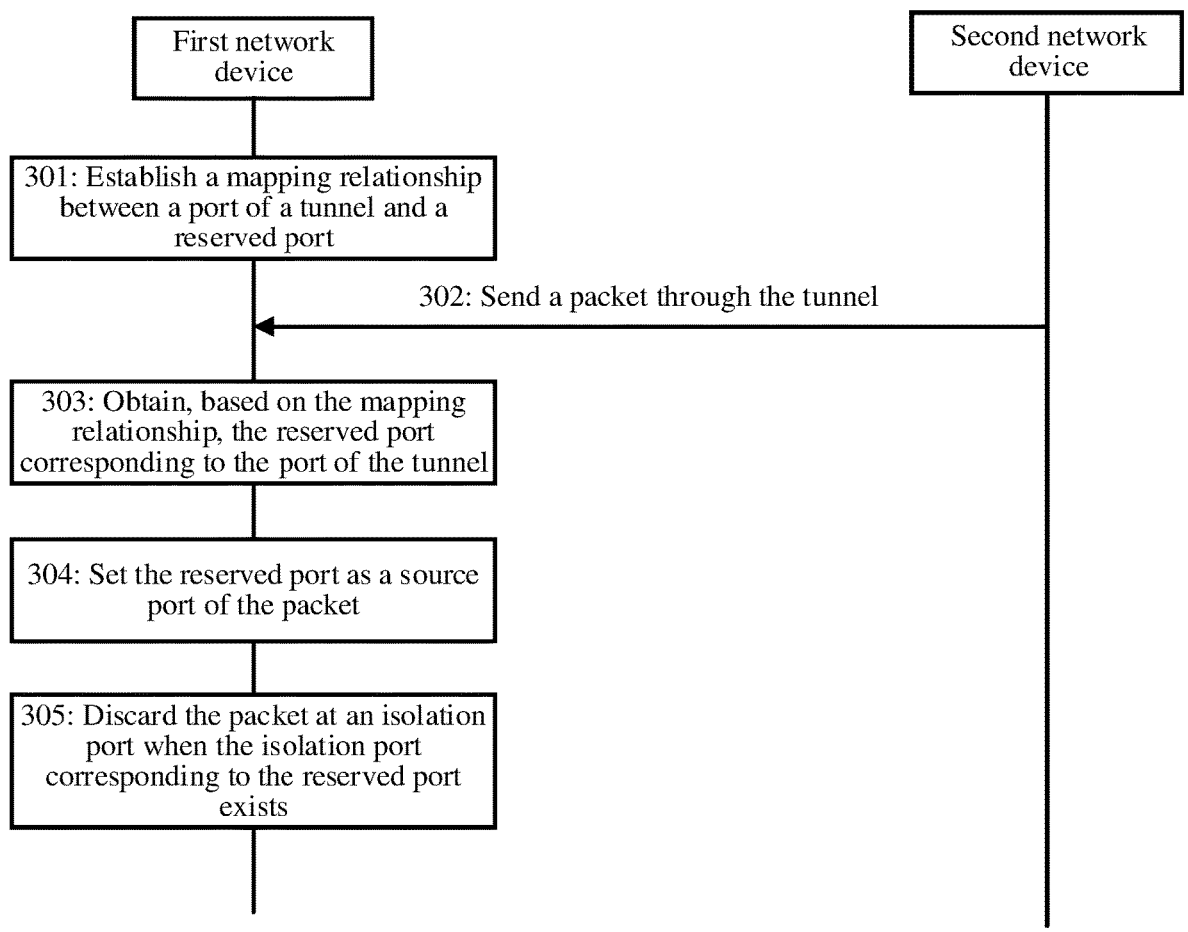
FIG. 3 is a schematic flowchart of a packet processing method according to an embodiment.

Refer to FIG. 3. A data packet processing method in an embodiment includes the following steps.

301: A first network device establishes a mapping relationship between a port of a tunnel and a reserved port. The first network device and a second network device are member devices of a multi-chassis link aggregation group. The tunnel is established between the first network device and the second network device (to be specific, the tunnel is for communication between the member devices of the multi-chassis link aggregation group). The first network device establishes the mapping relationship between the port of the tunnel and the reserved port. Specifically, the first network device maps the port of the tunnel to the reserved port of the first network device, and a control plane of the first network device delivers the mapping relationship to a forwarding plane of the first network device.

In this embodiment, the first network device may be a member device of one or more multi-chassis link aggregation groups, and different multi-chassis link aggregation groups do not affect each other. In other words, the first network device may create an independent tunnel for each M-LAG and establish a mapping relationship between a port of the tunnel and a reserved port, to be specific, record a reserved port corresponding to a port of each tunnel.

In an example, the multi-chassis link aggregation group includes a switch A and a switch B, a tunnel is established between the switch A and the switch B, and the switch B establishes a mapping relationship between a port 1 of the tunnel and a reserved port 200 of the switch B.

302: The second network device sends a packet to the first network device through the tunnel.

The second network device sends the packet to the first network device through the tunnel, and the first network device receives the packet sent by the second network device through the tunnel. When the packet is a data packet, isolation needs to be performed on the first network device to prevent the packet from being sent back to a source device of the data packet through an M-LAG member port of the first network device.

303: The first network device determines, based on the mapping relationship, the reserved port that is of the first network device and that corresponds to the port of the tunnel.

For example, the first network device determines, based on the mapping relationship in step 301, the reserved port that is of the first network device and that corresponds to the port of the tunnel. In an example, the multi-chassis link aggregation group includes the switch A and the switch B, the tunnel is established between the switch A and the switch B, the switch B establishes the mapping relationship between the port 1 of the tunnel and the reserved port 200, and the switch B determines, based on the mapping relationship, the reserved port 200 corresponding to the port 1 of the tunnel.

304: The first network device sets the reserved port as a source port of the packet.

When the packet is sent through the tunnel, a transmitter (a first end of the tunnel) adds an encapsulation header (for example, a VXLAN header, a GRE header, or the like) corresponding to the tunnel to the packet. After receiving the encapsulated packet, a receiver (a second end of the tunnel) removes the encapsulation header to obtain the packet before encapsulation. Therefore, after receiving the packet sent by the second network device through the tunnel, the first network device decapsulates the packet (where herein processing on packet content is not concerned, and therefore, packets obtained before decapsulation and after decapsulation are collectively referred to as packets). Then, the first network device sets the reserved port as the source port of the packet. For example, the first network device may send the packet to a sending queue of the reserved port, or the first network device may store the packet, and record the source port of the packet.

305: When an isolation port corresponding to the reserved port exists, the first network device discards the packet at the isolation port.

When the first network device is a member device of a plurality of M-LAGs, in this embodiment, the first network device configures an isolation group for each M-LAG. Each isolation group includes a member port and a reserved port of one M-LAG, that is, the M-LAG member port of the first network device is the isolation port corresponding to the reserved port. Reserved ports of the plurality of M-LAGs may be the same or different. Communication between ports in a same isolation group is forbidden.

In a downlink forwarding processing procedure of the packet, when the first network device determines that the isolation port corresponding to the reserved port exists, the first network device discards the packet at the isolation port (that is, the packet is not forwarded to the isolation port). Specifically, the first network device performs a port isolation check before forwarding the packet. Because the reserved port used as the source port of the packet and the M-LAG member port used as a destination port are in a same isolation group, the first network device discards the packet at the member port of the M-LAG.

In this embodiment, the first network device establishes the mapping relationship between the port of tunnel and the reserved port of the first network device, and determines, based on the mapping relationship, the reserved port corresponding to the port of the tunnel. Because the first network device configures the isolation group for each M-LAG, the reserved port is forbidden to communicate with the M-LAG member port (that is, the isolation port) in a same isolation group. Therefore, the first network device may discard the data packet at the isolation port. In this application, the first network device can implement data packet isolation without occupying an additional ACL bank, thereby saving ACL resources in the first network device.

Figure 4:
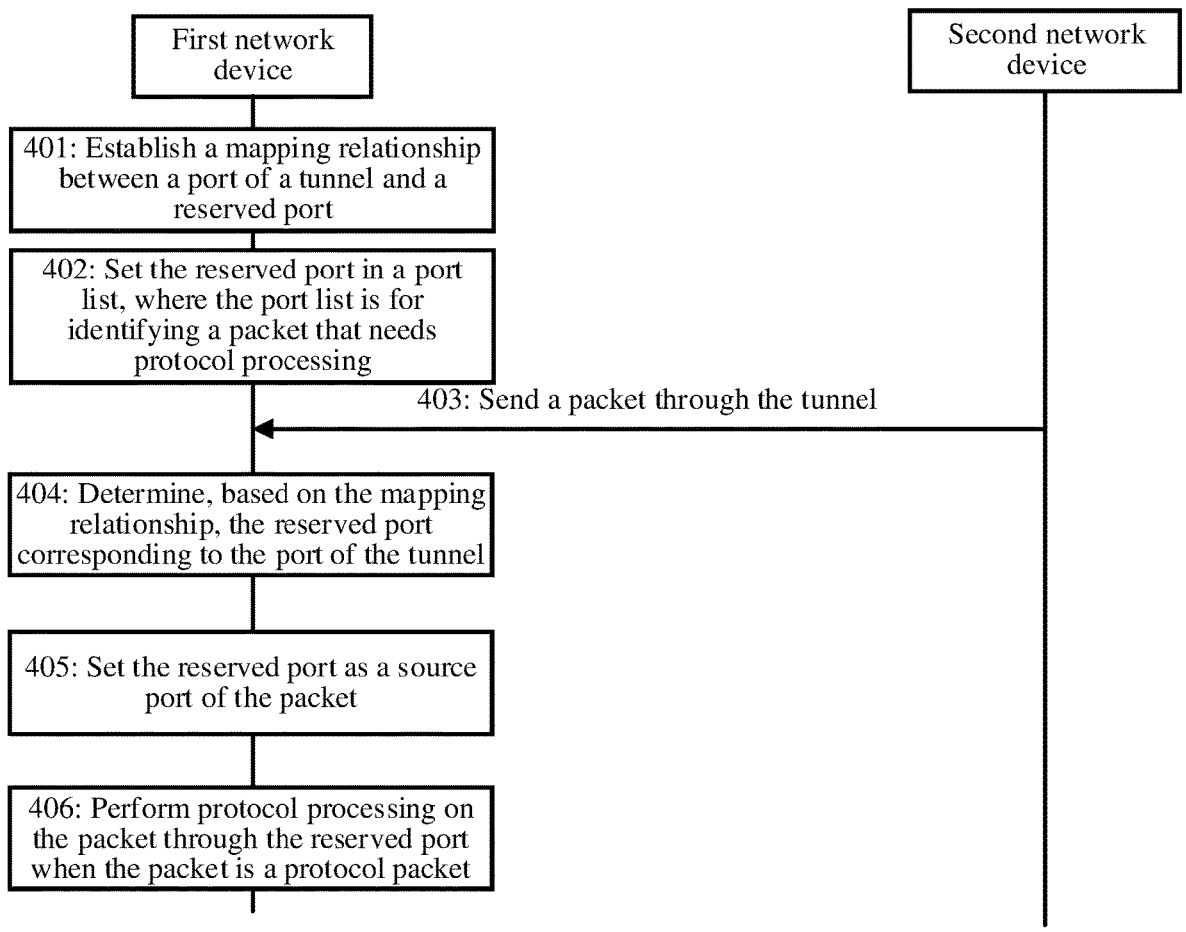
FIG. 4 is another schematic flowchart of a packet processing method according to an embodiment.

Refer to FIG. 4. A procedure of a protocol packet processing method according to one embodiment includes the following steps.

401: A first network device establishes a mapping relationship between a port of a tunnel and a reserved port.

Step 401 is similar to step 301 in the embodiment shown in FIG. 3. Details are not described herein again.

402: The first network device sets the reserved port in a port list, where the port list is for identifying a packet that needs protocol processing.

The first network device sets the reserved port in the port list. The port list is for identifying the packet that needs the protocol processing. Specifically, when the first network device configures initialization of a multi-chassis link aggregation group, the first network device pre-sets the reserved port in the port list. The first network device may identify, depending on whether a source port of a packet is hit in the port list, the packet that needs the protocol processing.

403: A second network device sends the packet to the first network device through the tunnel.

The second network device sends the packet to the first network device through the tunnel. When the packet is a protocol packet, the first network device needs to perform protocol processing on the protocol packet. A protocol processing process includes: The first network device performs, at the first network device, table lookup and forwarding on a layer packet obtained by decapsulating the packet.

404: The first network device determines, based on the mapping relationship, the reserved port that is of the first network device and that corresponds to the port of the tunnel.

405: The first network device sets the reserved port as the source port of the packet.

Step 404 and step 405 are similar to step 302 to step 304 in the embodiment shown in FIG. 3. Details are not described herein again.

406: When the packet is a protocol packet, the first network device performs protocol processing on the packet through the reserved port.

When the packet received by the first network device is a protocol packet (for example, an STP protocol packet), the first network device performs protocol processing on the packet based on the reserved port.

Specifically, a process in which the first network device performs protocol processing on the packet includes: The first network device queries whether the reserved port is configured in the port list for the protocol processing. If the reserved port is configured, the first network device matches a characteristic of the protocol packet according to an ACL rule. If the characteristic matching of the protocol packet succeeds, the first network device performs protocol processing on the packet. A process of the protocol processing includes: The first network device sends the protocol packet to a central processing unit.

In this embodiment, the first network device establishes the mapping relationship between the port of the tunnel and the reserved port, and determines, based on the mapping relationship, the reserved port corresponding to the port of the tunnel. Because the first network device pre-sets the reserved port in the port list for identifying the packet that needs the protocol processing, the first network device processes the packet depending on whether the port list hits the reserved port. It can be learned that the first network device can forward the protocol packet without occupying an additional ACL bank, thereby saving ACL resources in the first network device.

In this embodiment, one or more tunnels exist between the first network device and the second network device. When a plurality of tunnels exist between the first network device and the second network device, ports of the plurality of tunnels are mapped to different reserved ports. The tunnel between the first network device and the second network device includes an IPv4 tunnel or an IPv6 tunnel.

In this embodiment, the tunnel between the first network device and the second network device includes a virtual extensible local area network (VXLAN) tunnel, a generic routing encapsulation (GRE) tunnel, or a multi-protocol label switching (MPLS) tunnel. This is not specifically limited herein.

The foregoing describes the packet processing method provided in embodiments, and the following describes the network device provided in embodiments.

Figure 5:
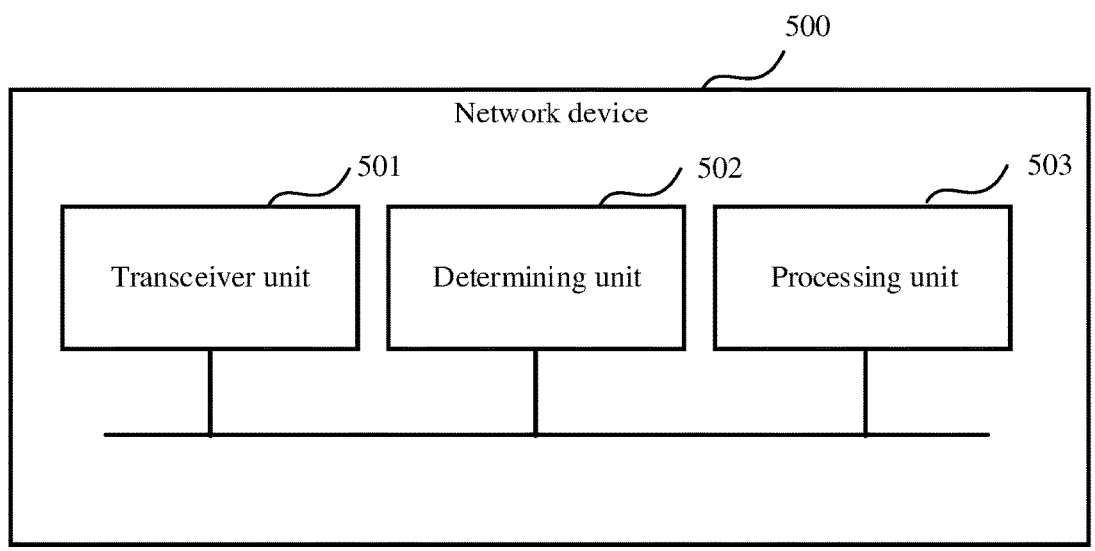
FIG. 5 is a schematic diagram of a structure of a network device according to an embodiment.

Refer to FIG. 5. A network device 500 provided in an embodiment includes:
- a transceiver unit 501, configured to receive a packet sent by a second network device, where the packet reaches a first network device through a tunnel between the network device 500 and the second network device;
- a determining unit 502, configured to determine a reserved port of the network device 500 corresponding to a port of the tunnel; and
- a processing unit 503, configured to process the packet based on the reserved port.

In a possible implementation, the processing unit 503 is specifically configured to set the reserved port as a source port of the packet.

In a possible implementation, the processing unit 503 is specifically configured to discard the packet at an isolation port when the isolation port corresponding to the reserved port exists. The isolation port and the reserved port are in a same isolation group, and communication between ports in the isolation group is forbidden.

In a possible implementation, the network device 500 and the second network device form a multi-chassis link aggregation group M-LAG. A first port of the network device 500 and a second port of the second network device are member ports of the M-LAG, and the isolation port includes the first port.

In a possible implementation, when the packet is a protocol packet, the processing unit 503 is specifically configured to perform protocol processing on the packet based on the reserved port.

In a possible implementation, the processing unit 503 sets the reserved port in a port list. The port list is for identifying a packet that needs the protocol processing.

In a possible implementation, the processing unit 503 establishes a mapping relationship between the port of the tunnel and the reserved port of the network device 500.

Further, the processing unit 503 is specifically configured to determine, based on the mapping relationship, the reserved port that is of the first network device and that corresponds to the port of the tunnel.

In a possible implementation, one or more tunnels exist between the network device 500 and the second network device. When a plurality of tunnels exist between the network device 500 and the second network device, ports of the plurality of tunnels are mapped to different reserved ports.

In a possible implementation, the tunnel may be a VXLAN tunnel, a GRE tunnel, or an MPLS tunnel.

The network device 500 that includes the transceiver unit 501, the determining unit 502, and the processing unit 503 in this embodiment may correspond to the first network device in the foregoing method embodiments. The network device 500 may implement functions and/or various steps implemented by the first network device in the foregoing method embodiments. For brevity, details are not described herein again.

Figure 6:
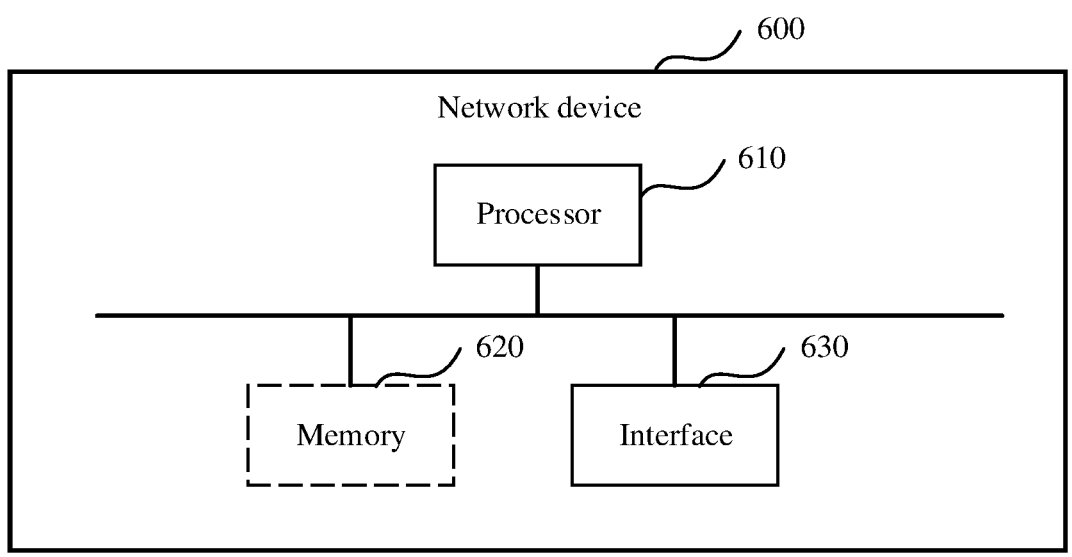
FIG. 6 is another schematic diagram of a structure of a network device according to an embodiment.

Refer to FIG. 6. FIG. 6 is a schematic diagram of a network device according to an embodiment. The network device is for implementing operations of the first network device in the foregoing embodiments. As shown in FIG. 6, the network device 600 includes: a processor 610 and an interface 630. The processor 610 is coupled to the interface 630. The interface 630 is configured to communicate with another device. The interface 630 may be a transceiver or an input/output interface. The interface 630 may be, for example, an interface circuit.

Optionally, the communication apparatus further includes a memory 620 configured to store instructions executed by the processor 610, store input data required by the processor 610 to run the instructions, or store data generated after the processor 610 runs the instructions.

The method executed by the first network device in the foregoing embodiments may be implemented by invoking, by the processor 610, a program stored in a memory (which may be the memory 620 in the first network device, or may be an external memory). To be specific, the first network device may include the processor 610. The processor 610 invokes the program in the memory to perform the method performed by the first network device in the foregoing method embodiments. The processor herein may be an integrated circuit having a signal processing capability, for example, a central processing unit (CPU). The first network device may be implemented by one or more integrated circuits configured to implement the foregoing methods. For example, one or more application specific integrated circuits (ASICs), one or more microprocessors, e.g. digital signal processors (DSPs), one or more field programmable gate arrays (FPGAs), or a combination of at least two of these integrated circuit forms. Alternatively, the foregoing implementations may be combined.

Specifically, functions/implementation processes of the transceiver unit 501, the determining unit 502, and the processing unit 503 in FIG. 5 may be implemented by invoking, by the processor 610 in the network device 600 shown in FIG. 6, computer-executable instructions stored in the memory 620.

Alternatively, the functions/implementation processes of the determining unit 502 and the processing unit 503 in FIG. 5 may be implemented by invoking, by the processor 610 in the network device 600 shown in FIG. 6, computer-executable instructions stored in the memory 620. The functions/implementation processes of the transceiver unit 501 in FIG. 5 may be implemented by the interface 630 in the network device 600 shown in FIG. 6. For example, the functions/implementation processes of the transceiver unit 501 may be implemented by invoking, by the processor, program instructions in the memory to drive the interface 630.

In another embodiment, a computer-readable storage medium is further provided. The computer-readable storage medium stores computer-executable instructions. When a processor of a device executes the computer-executable instructions, the device performs the steps performed by the first network device in the foregoing method embodiments.

In another embodiment, a computer program product is further provided. The computer program product includes computer-executable instructions, and the computer-executable instructions are stored in a computer-readable storage medium. When a processor of a device executes the computer-executable instructions, the device performs the steps performed by the first network device in the foregoing method embodiments.

It may be clearly understood by a person skilled in the art that, for convenient and brief description, for a detailed working process of the foregoing system, apparatus, and unit, refer to a corresponding process in the foregoing method embodiments, and details are not described herein again.

In several embodiments, it should be understood that the disclosed system, apparatus, and method may be implemented in other manners. For example, the described apparatus embodiment is merely an example. For example, division into the units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by some interfaces. The indirect couplings or communication connections between the apparatuses or units may be implemented in an electronic, a mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of solutions of embodiments.

In addition, functional units in embodiments may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions, or the part contributing to the conventional technology, or all or some of the technical solutions may be implemented in a form of a software product. The software product is stored in a storage medium and includes several instructions for instructing a computer device (which may be a personal computer, a server, or a network device) to perform all or some of the steps of the methods in embodiments. The foregoing storage medium includes any medium that can store program code, such as a USB flash drive, a removable hard disk, a read-only memory (ROM), a random access memory (RAM), a magnetic disk, or an optical disc.

What is claimed is:

1. A packet processing method, the method comprising:
    receiving, by a first network device via a tunnel between the first network device and a second network device, a data packet sent by the second network device, wherein the first network device and the second network device are members of a multi-chassis link aggregation group (M-LAG), and wherein the data packet is received at a port of the tunnel
    establishing, by the first network device, a mapping relationship between the port of the tunnel and a first reserved port of the first network device; and
    determining, by the first network device, the first reserved port based on the mapping relationship; and
    processing, by the first network device, the data packet based on the first reserved port by not sending, by the first network device, the data packet to a first isolation port corresponding to the first reserved port, wherein the first isolation port and the first reserved port are in a same first isolation group corresponding to the M-LAG, wherein the first isolation port is a first port of the first network device, wherein the first port of the first network device is a member port of the M-LAG,
    wherein the first network device is a member device of a second M-LAG, wherein a second isolation group comprises a second isolation port and a second reserved port, wherein the second isolation port is a second port of the first network device, wherein the second port of the first network device is a member port of the second M-LAG, the second reserved port corresponding to the port of the tunnel.

2. The method according to claim 1, wherein the processing, by the first network device, the packet based on the first reserved port further comprises:
    setting, by the first network device, the first reserved port as a source port of the packet.

3. The method according to claim 1, wherein a plurality of tunnels exist between the first network device and the second network device, and ports of the plurality of tunnels are mapped to different reserved ports.

4. The method according to claim 1, wherein the tunnel is a virtual extensible local area network (VXLAN) tunnel, a generic routing encapsulation (GRE) tunnel, or a multi-protocol label switching (MPLS) tunnel.

5. A network device, comprising:
    processing circuitry; and
    a memory having stored thereon program instructions that, when executed by the processing circuitry, cause the network device to:
    receive, via a tunnel between the network device and a second network device, a data packet sent by the second network device, wherein the network device and the second network device are members of a multi-chassis link aggregation group (M-LAG), and wherein the data packet is received at a port of the tunnel;
    determine a mapping relationship between the port of the tunnel and a first reserved port of the network device; and
    determine, by the first network device, the first reserved port based on the mapping relationship; and
    process the data packet based on the first reserved port by not sending, by the first network device, the data packet to a first isolation port corresponding to the first reserved port,
    wherein the first isolation port and the first reserved port are in a same first isolation group corresponding to the M-LAG, wherein the first isolation port is a first port of the first network device, wherein the first port of the first network device is a member port of the M-LAG,
    wherein the first network device is a member device of a second M-LAG, wherein a second isolation group comprises a second isolation port and a second reserved port, wherein the second isolation port is a second port of the first network device, wherein the second port of the first network device is a member port of the second M-LAG, the second reserved port corresponding to the port of the tunnel.

6. The network device according to claim 5, wherein the program instructions, when executed by the processing circuitry, further cause the network device to set the first reserved port as a source port of the data packet.

7. The network device according to claim 5, wherein a plurality of tunnels exist between the network device and the second network device, and wherein ports of the plurality of tunnels are mapped to different reserved ports.

8. The network device according to claim 5, wherein the tunnel is a virtual extensible local area network (VXLAN) tunnel, a generic routing encapsulation (GRE) tunnel, or a multi-protocol label switching (MPLS) tunnel.

9. A non-transitory computer-readable storage medium, comprising instructions that, when executed by a processor, cause the processor to perform the method according to claim 1.

* * * * *